United States Patent
Hardesty et al.

(10) Patent No.: US 6,643,928 B2
(45) Date of Patent: *Nov. 11, 2003

(54) METHOD OF MANUFACTURING AN EXHAUST EMISSION CONTROL DEVICE

(75) Inventors: Jeffrey B. Hardesty, Byron, MI (US); John C. Boehnke, Grand Blanc, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/125,257

(22) Filed: Apr. 17, 2002

(65) Prior Publication Data

US 2002/0116817 A1 Aug. 29, 2002

Related U.S. Application Data

(63) Continuation of application No. 09/771,466, filed on Jan. 26, 2001, now Pat. No. 6,438,839.
(60) Provisional application No. 60/239,787, filed on Oct. 12, 2000.

(51) Int. Cl.[7] .............................................. B23P 15/00
(52) U.S. Cl. ....................................... 29/890; 29/419.2
(58) Field of Search ............................... 29/890, 419.2; 219/600, 602, 603, 604, 607, 612, 617; 72/54, 56

(56) References Cited

U.S. PATENT DOCUMENTS

| | | | | |
|---|---|---|---|---|
| 3,088,200 A | * | 5/1963 | Birdsall et al. ................ | 72/56 |
| 3,258,573 A | * | 6/1966 | Morin et al. ................ | 219/608 |
| 3,407,637 A | * | 10/1968 | Dietz et al. .................... | 72/56 |
| 3,447,350 A | * | 6/1969 | Schenk .......................... | 72/56 |
| 3,520,049 A | * | 7/1970 | Lysenko et al. ............. | 219/617 |
| 4,413,392 A | | 11/1983 | Otani et al. ............... | 29/157 R |
| 4,531,393 A | * | 7/1985 | Weir .............................. | 72/56 |
| 4,619,127 A | | 10/1986 | Sano et al. | |
| 4,619,137 A | * | 10/1986 | Bott .......................... | 73/146.5 |
| 4,656,713 A | | 4/1987 | Rosa et al. ................ | 29/157 R |
| 4,864,095 A | | 9/1989 | Yamashita et al. ........ | 219/86.24 |
| 5,671,522 A | * | 9/1997 | Aronne ..................... | 29/419.2 |
| 5,813,264 A | * | 9/1998 | Steingroever ................. | 72/56 |
| 5,826,320 A | * | 10/1998 | Rathke et al. ............. | 29/419.2 |
| 5,966,813 A | * | 10/1999 | Durand ..................... | 29/897.2 |
| 5,981,921 A | * | 11/1999 | Yablochnikov ............ | 219/603 |
| 6,065,317 A | * | 5/2000 | Steingroever ................. | 72/56 |
| 6,104,012 A | * | 8/2000 | Durand ...................... | 219/617 |
| 6,229,125 B1 | * | 5/2001 | Livshiz et al. ............. | 219/617 |

\* cited by examiner

Primary Examiner—I Cuda-Rosenbaum
(74) Attorney, Agent, or Firm—Jimmy L. Funke

(57) ABSTRACT

In one embodiment, a method for manufacturing a device comprises disposing a first end around a second end, disposing an induction coil around the first end, discharging a current through the induction coil, forming eddy currents on the surface of the first end, and magnetic impulse sizing the first end and the second end together. The first end disposed around the second end comprises a tube end disposed around an end of the device or the first end disposed around the second end comprises the device end disposed around the tube end.

15 Claims, 4 Drawing Sheets

METHOD OF MANUFACTURING AN EXHAUST EMISSION CONTROL DEVICE

CROSS REFERENCE TO RELATED APPLICATIONS

This application is a continuation application of and claims the benefit of U.S. patent application Ser. No. 09/771,466, filed Jan. 26, 2001, now U.S. Pat. No. 6,438,839 which claims the benefit of the filing date of U.S. Provisional Application Ser. No. 60/239,787 filed on Oct. 12, 2000, both of which are incorporated herein in their entirety.

TECHNICAL FIELD

This disclosure relates to a method of manufacturing an exhaust emission control device.

BACKGROUND

The removal of emissions, such as hydrocarbon, carbon monoxide, nitrogen oxide, particulate matter, and the like, from the exhaust gases of internal combustion engines enables cleaner operating vehicles. One focus area for such exhaust emission reduction has been in the area of post combustion control. Namely, post combustion control includes the placement of one or more exhaust emission control devices in the exhaust down stream of the internal combustion engine. Such exhaust emission control devices include catalytic converters, catalytic absorbers, diesel particulate traps, non-thermal plasma conversion devices, and the like.

Many exhaust emission control devices comprise a frangible or fragile structure that is prone to crushing and damage in the exhaust environment. For example, exhaust emission control devices have used a substrate, commonly comprising ceramic, cordierite, carbon, and the like, with a high surface area for exposing the substrate to the exhaust gas. In the example where exhaust emission control device is a catalytic converter, the substrate has a catalytically active material supported thereon.

During operation, the exhaust gases pass over the substrate and contact the catalyst where the amount of hydrocarbons, carbon monoxide, and oxides of nitrogen are reduced. The temperature of the catalyst is typically between 750° C. and 950° C., with about 350° C. to about 450° C. common for diesel exhausts, and may be higher depending upon the location of the catalytic converter relative to the engine of the automobile. To lessen the effects of this high temperature, a support material cushions and insulates the catalyst material from a housing in which the substrate and catalyst are mounted.

There are several common conventional methods for making exhaust emission control devices, the "clamshell" method, the "tourniquet" method, and the "stuffed" method. In the clamshell method, the internal end-cones and insulative material are cut to conform with each clamshell half, and the halves of the shell are assembled together by a welding process. The devices made by this method have reduced durability due to the poor control of the mat support material density.

The "tourniquet" method for forming a catalytic converter comprises wrapping the shell around the catalyst substrate and support mat assembly. The shell is formed by welding the edges while the assembly is squeezed at rated pressures calculated to optimize the support mat density. The end-cones are then welded to the shell assembly to form the catalytic converter. Although this method also has the disadvantages of increased cost due to the number of components that have to be processed and also the added cost of welding wires and gases, it claims improved mat density control.

The "stuffed" (with welded end-cone assemblies) method for forming a catalytic converter comprises wrapping the catalyst substrate in the insulative support material and stuffing it, under pressure, into a preformed typically round shell. The end-cone assemblies with the insulating material are fitted and welded to the shell assembly to form the catalytic converter. Conventional welding techniques have been commonly used to form these catalytic converters.

Conventional welding techniques involve the application of heat to localized areas of two metallic work pieces, which results in a uniting of the two work pieces. This type of welding may or may not be performed with the application of pressure, and may or may not include the use of a filler material. The drawbacks of conventional welding techniques include the creation of a high amount of heat that risks damage to the parts being welded. Another drawback is that dissimilar metals and work pieces of different gauge thicknesses cannot be joined, thereby limiting the materials used in forming catalytic converters. Lastly, these conventional techniques are expensive since they require a welding process that consumes welding wires and costly welding gases.

Accordingly, there remains a need in the art for a method for manufacturing a catalytic converter that is easily welded and cost effective.

SUMMARY

Disclosed herein are methods for producing an exhaust emission control devices. In one embodiment, the method for manufacturing an exhaust emission control device comprises: disposing a first end around a second end, disposing an induction coil around the first end, discharging a current through the induction coil, forming eddy currents on the surface of the first end, and magnetic impulse sizing the first end and the second end together. The first end disposed around the second end comprises a tube end disposed around an end of an exhaust emission control device or the first end disposed around the second end comprises the exhaust emission control device end disposed around the tube end.

Another embodiment of a method for manufacturing an exhaust emission control device comprises disposing a substrate within a shell and disposing an induction coil around the shell, discharging a current through the induction coil, forming eddy currents on the surface of the shell, and magnetic impulse sizing or welding the shell about the substrate.

Another embodiment of a method for manufacturing an exhaust emission control device comprises disposing a substrate surrounded by a mat support material within a shell and disposing an induction coil around the shell, discharging a current through the induction coil, forming eddy currents on the surface of the shell, and magnetic impulse sizing the shell about the substrate.

Yet another embodiment of a method for manufacturing an exhaust emission control device comprises disposing a first end around a second end and disposing an induction coil around the first end, discharging a current through the induction coil, forming eddy currents on the surface of the first end, and magnetic impulse welding the first end and the second end together.

BRIEF DESCRIPTION OF THE DRAWINGS

Referring now to the figures, which are meant to be exemplary, not limiting, and wherein like elements are numbered alike in several figures, in which.

DETAILED DESCRIPTION OF THE PREFERRED EMBODIMENTS

Although the present invention, and namely the embodiments illustrated in the figures, is described in relation to a catalytic converter, it is clearly understood that the invention applies to all exhaust emission control devices, including particulate filters, plasma conversion devices (e.g., non-thermal plasma reactors), catalytic converters, traps (e.g., sulfur, hydrogen, sulfides, carbon monoxides, carbon sulfides including, but not limited to, methyl sulfides, ethyl sulfides, propyl sulfides, butyl sulfides, and thiols, mercaptans, disulfides thiophenes, and their derivatives, and the like), adsorbers/absorbers, and the like.

An exhaust emission control device, for use in an engine emissions control system, optionally has a catalyst substrate with a catalyst that can be concentrically disposed within a shell. Depending upon the type of device, the shell may be disposed around a filter (e.g., carbon or the like for a diesel particulate trap), a catalyst substrate, and other elements. For a catalytic converter, for example, a mat support or insulating material can be disposed concentrically around the catalyst substrate adjacent to the shell. For "stuffed" catalytic converters, the catalyst substrate is wrapped in the insulative support material and stuffed under pressure into a preformed, typically round, shell. The end cone assemblies, endplate, exhaust manifold, or the like, with the insulating material, are fitted and welded to the shell assembly to form the catalytic converter.

Figure 1:
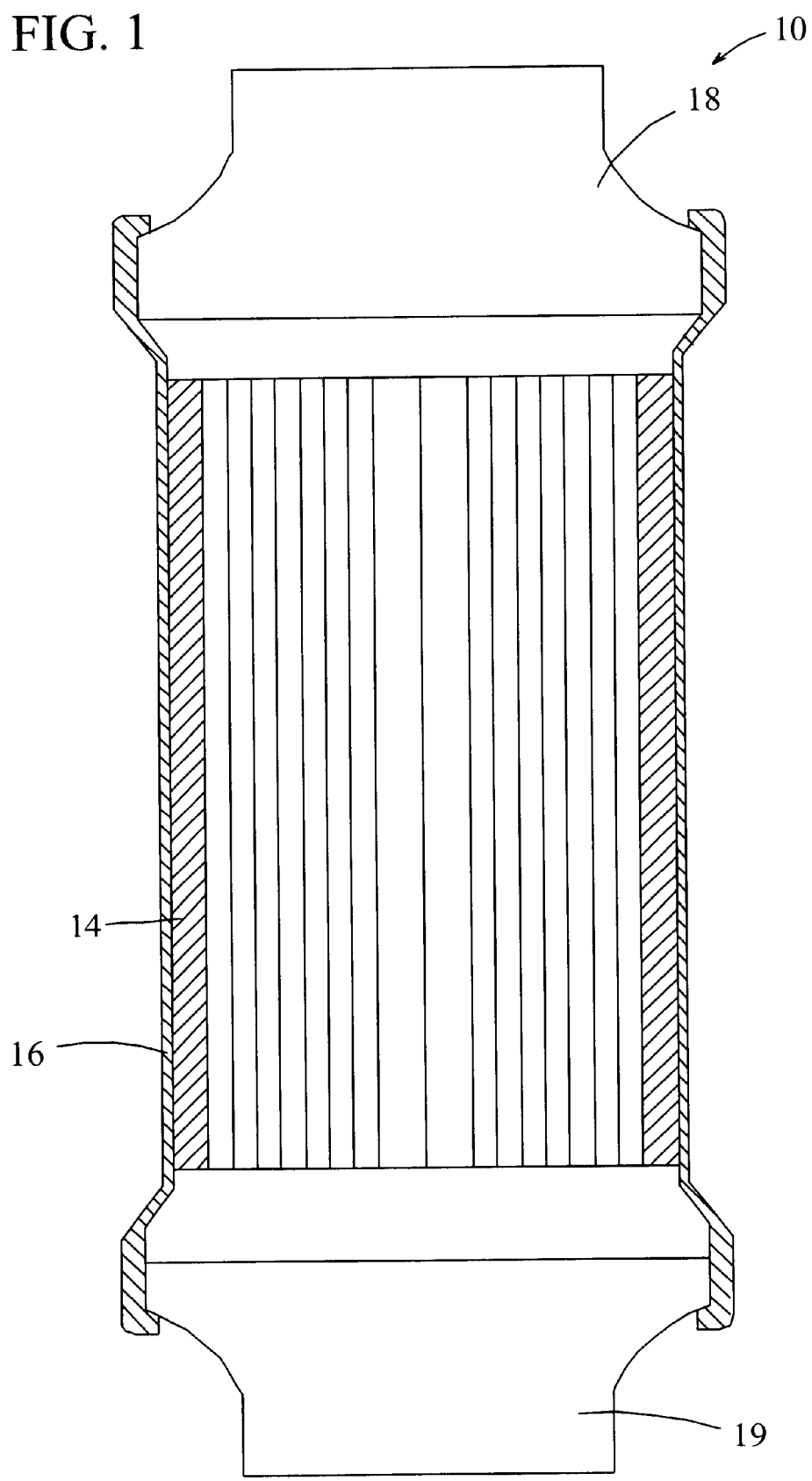
FIG. 1 is cross sectional side view of an exemplary catalytic converter.

Referring to FIG. 1, the exhaust emission control device 10 comprises an element (i.e., substratum, support, or substrate) 12 optionally disposed within a mat support (or insulating material) 14 and further disposed within a shell 16. Two end-pieces (end cones, exhaust manifolds, or endplates) 18, 19 are attached to the shell 16 on either end of the exhaust emission control device 10.

The element/substrate 12 can comprise any material designed for use in a spark ignition or diesel engine environment and have the following characteristics: (1) capable of operating at temperatures up to about 1,000° C.; (2) capable of withstanding exposure to hydrocarbons, nitrogen oxides, carbon monoxide, carbon dioxide, and/or sulfur; and (3) having sufficient surface area and structural integrity to support the desired catalyst. Some possible elements (e.g., catalyst substrate, filters, and the like) include ceramic (e.g., cordierite, alumina, and the like), metallic, cermet, and carbides (e.g., silica carbide, and the like), silicides, nitrides (e.g., silica nitride, and the like), in the form of foils, sponges, perform, mat, fibrous material, porous glasses, foams, pellets, particles, molecular sieves, and the like (depending upon the particular device), and mixtures comprising at least one of the foregoing materials and forms.

Although the element 12 can have any size or geometry, the size and geometry are preferably chosen to optimize the surface area in the given device design parameters. Typically, a catalyst substrate has a honeycomb geometry; with the combs being any multi-sided or rounded shape, with substantially square, hexagonal, octagonal or similar geometries preferred due to the ease of manufacturing and increased surface area. A particulate filter may comprise a fibrous perform or the like, while a non-thermal plasma reactor may comprise parallel plates or tubular structures with electrodes disposed thereon.

The element 12 will preferably have a surface area sufficient to support a sufficient amount of catalyst(s) to effectively catalyze/adsorb/filter, accordingly, exhaust gas streams flowing therethrough, with the surface area being a function of the surface design of the element, the volume of the element, and the effective density of the element. These parameters may be adjusted according to the design needs, taking into account both the desired shape of the exhaust emissions control device and optimal paths for exhaust gas flow.

Disposed on and/or throughout at least a portion of the element 12 is optionally a catalyst or other material for converting exhaust gases to acceptable emission levels, for adsorbing and/or desorbing exhaust gas components, and/or for filtering out particulates, soot, and the like. The catalyst material can be applied over the entire surface area or selected portions of the element depending upon the several factors, including the structure of the element, the catalyst's properties, cost, catalyzing reaction conditions, gas passageway flow conditions, and the like. The catalyst may comprise one or more materials that are wash coated, imbibed, impregnated, physisorbed, chemisorbed, precipitated, or otherwise applied to the element. Possible materials include metals, such as platinum, palladium, rhodium, iridium, osmium, ruthenium, tantalum, zirconium, titanium, aluminum, yttrium, cerium, nickel, copper, iron, cobalt, molybdenum, tungsten, vanadium, silicon, cerium, carbon, and the like, as well as mixtures, oxides, and alloys comprising at least one of the foregoing materials. Additional materials include transition metals (e.g., nickel, iron, zinc, copper, molybdenum, manganese, vanadium, niobium, cobalt, and the like), carbonates, zeolitic and non-zeolitic matter (e.g., phosphates, molybdates, alumina containing equivalents, and the like) sodalites, scapolites, cancrinite structure type alumino-silicates, as well as alloys, oxides and combinations comprising at least one of the foregoing materials. Disposed around and concentric with element 12 is an optional mat support material 14 that provides support to the element 12 during operation of the exhaust emission control device 10 and thermal insulation for the shell 16. The mat support material may be any material capable of insulating the catalyst substrate and preferably capable of holding the catalyst substrate in the desired location while being inserted into a shell. The mat support material can be a formed fibrous material containing vermiculite, refractory ceramic fibers, organic binders, and other conventional materials, as well as combinations comprising at least one of the foregoing materials. The mat support material can either be a simple non-expanding ceramic material, or an intumescent material, e.g., one which contains a vermiculite component that expands with heating to maintain firm compression when the outer steel expands outward from the catalyst substrate, as well as material which include a combination of both.

The thickness of mat support material 14 will be dependent upon the temperature of the exhaust gas and the catalytic converter's application. For instance, the catalytic converter for a spark ignition environment will require a mat support material having a thickness that differs from the catalytic converter operating in a diesel environment. As the exhaust gas temperature range increases, the thickness of mat support material 14 typically increases accordingly to meet customer skin temperature requirements. Generally, the mat support material thickness is about 2 millimeters (mm) to about 12 mm preferred for most automotive applications. Additionally, the peripheral dimensions of each catalyst substrate and customer skin temperature requirements will determine the preferred length and width of the mat support material.

The mat support material 14 is disposed concentrically within the shell 16. Suitable materials for the shell can comprise any material that is capable of resisting under-car salt, temperature and corrosion. Some ferritic materials, such as, stainless steels including the 400 series, e.g., grades SS-409, SS-439, and SS-441, are generally preferred. The choice of material depends upon the type of exhaust gas, the maximum temperature of the gas and catalyst substrate, and the like.

Figure 2:
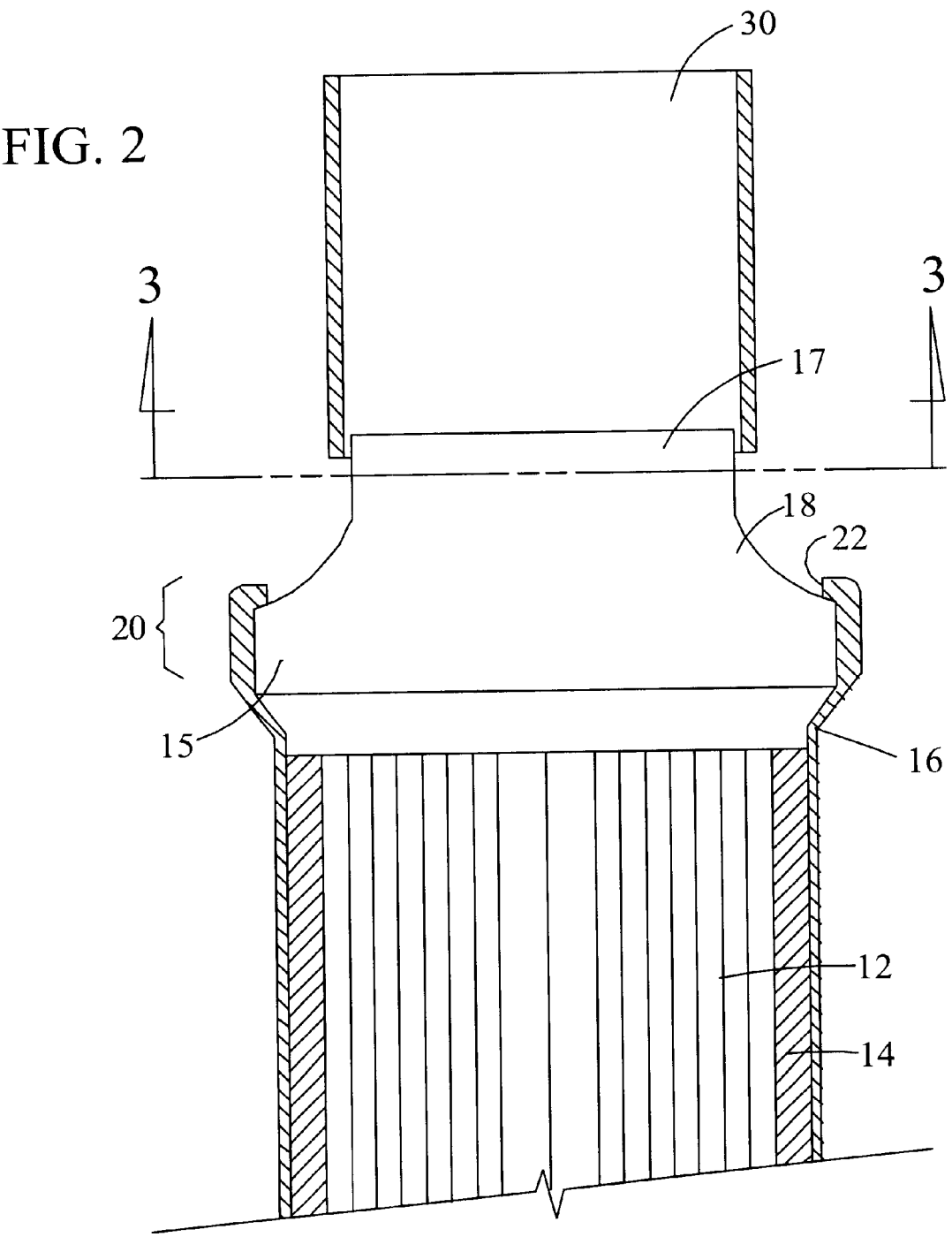
FIG. 2 is a partial side view of an exemplary catalytic converter with a pipe.

Referring now to FIG. 2, a portion of an exhaust emission control device (e.g., a catalytic converter) 10 is illustrated. The shell 16 comprises an end 20 that can be joined with a first portion 15 of endplate 18. The shell 16 can be joined with the endplate 18 at weld joint(s) 22, such that the end 20 can be disposed around, about, surround, or encompass the first portion 15 of endplate 18. An alternative embodiment includes having an endplate disposed around, about, surrounding, or encompassing a shell. A second portion 17 of endplate 18 can further connect with a pipe, cylinder, conduit, duct, or tube 30. Tube 30 can be disposed around (as shown in FIG. 2) or within the second portion 17 of endplate 18. The joining of these items can be achieved by any conventional welding practice, as well as by magnetic impulse (or pulse) welding.

Magnetic impulse welding is based on the use of the interaction of magnetic fields produced by an inductor through which an impulse of high intensity current is passed. The parts to be welded are positioned in spaced relation to one another. This method can be used for obtaining overlapping welded joints of thin walled parts having different thicknesses and made from different materials without melting.

Figure 3:
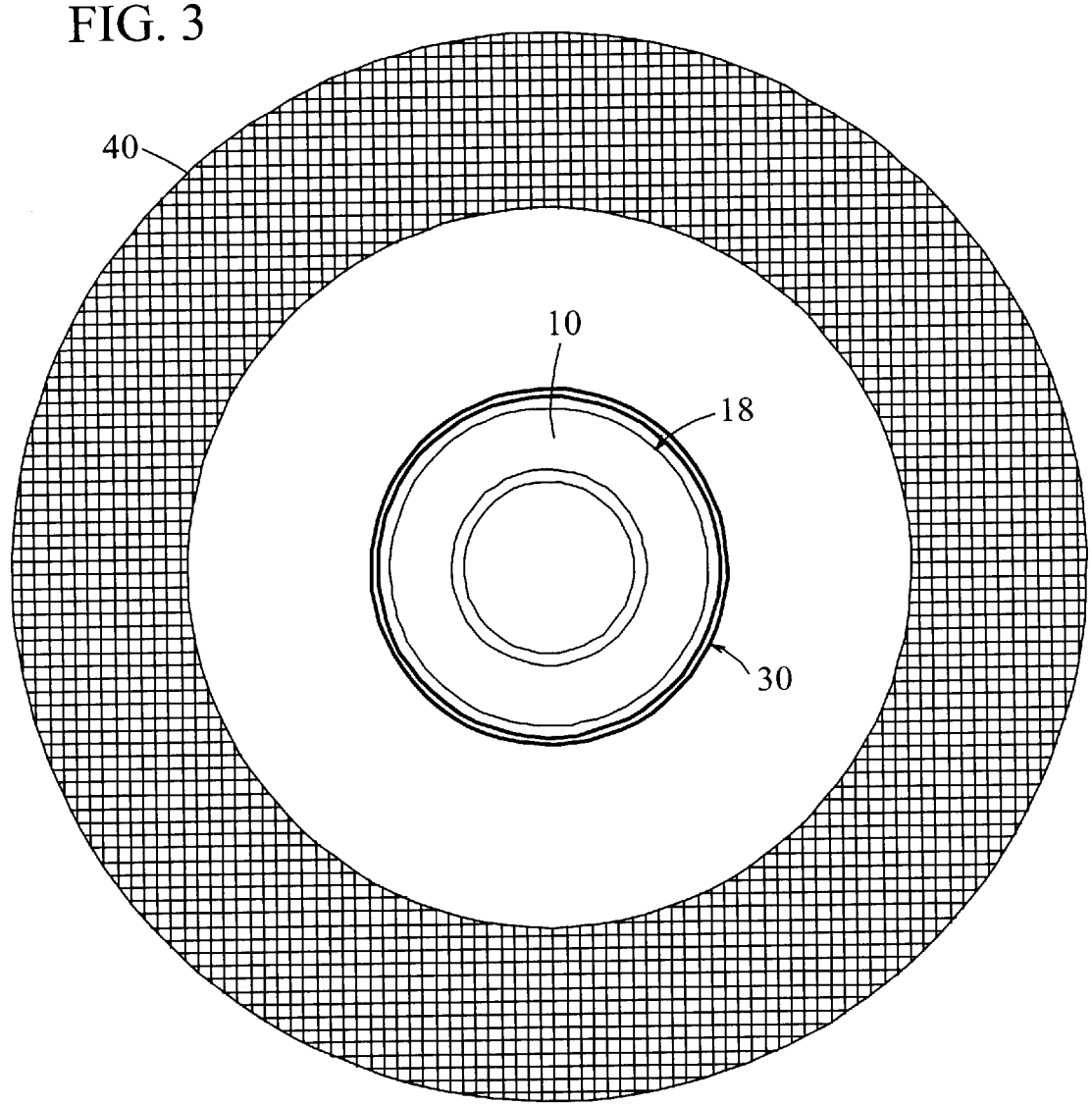
FIG. 3 is a cross sectional view of an exemplary catalytic converter, taken along lines 3—3 of FIG. 2.

In the process of magnetic impulse welding, the surfaces of metals approach each other and collide with high relative velocity. To magnetic impulse weld an exhaust emission control device, a magnetic impulse welding apparatus including a capacitor bank, an inductor, and a high current switching device can be used. Referring to FIG. 3, a cross sectional view of a catalytic converter 10 and a tube 30, taken along lines 3—3 of FIG. 2, within an inductor or induction coil 40 is provided. The tube 30 is positioned around the endplate 18, such that the tube 30 has a larger diameter than endplate 18. In the alternative, the endplate 18 or the like (e.g., endcone, exhaust manifold, etc.) can be placed around the tube 30, such that the endplate 18 has a larger diameter than the tube 30. During welding, a current can be discharged through the induction coil 40 to create eddy currents on the surface of the tube 30. The magnetic force collapses the tube 30 at a speed sufficient to collapse the tube 30 onto the endplate 18, creating a weld. Multiple welds can be completed on the same work piece. For example, the endplate 18 can be welded to the shell 16, as illustrated in FIG. 2 at the weld joint 22 or in the alternative, the endplate 18 can be welded around shell 16.

This method requires a current created in the induction coil of greater than about 750,000 amperes, with up to about 1,000,000 amperes preferred. Generally, the time to weld using this method is less than about 50 microseconds. This method can be used to join two work pieces made of steel, however it may also be used to join dissimilar materials, such as steel to aluminum.

Figure 4:
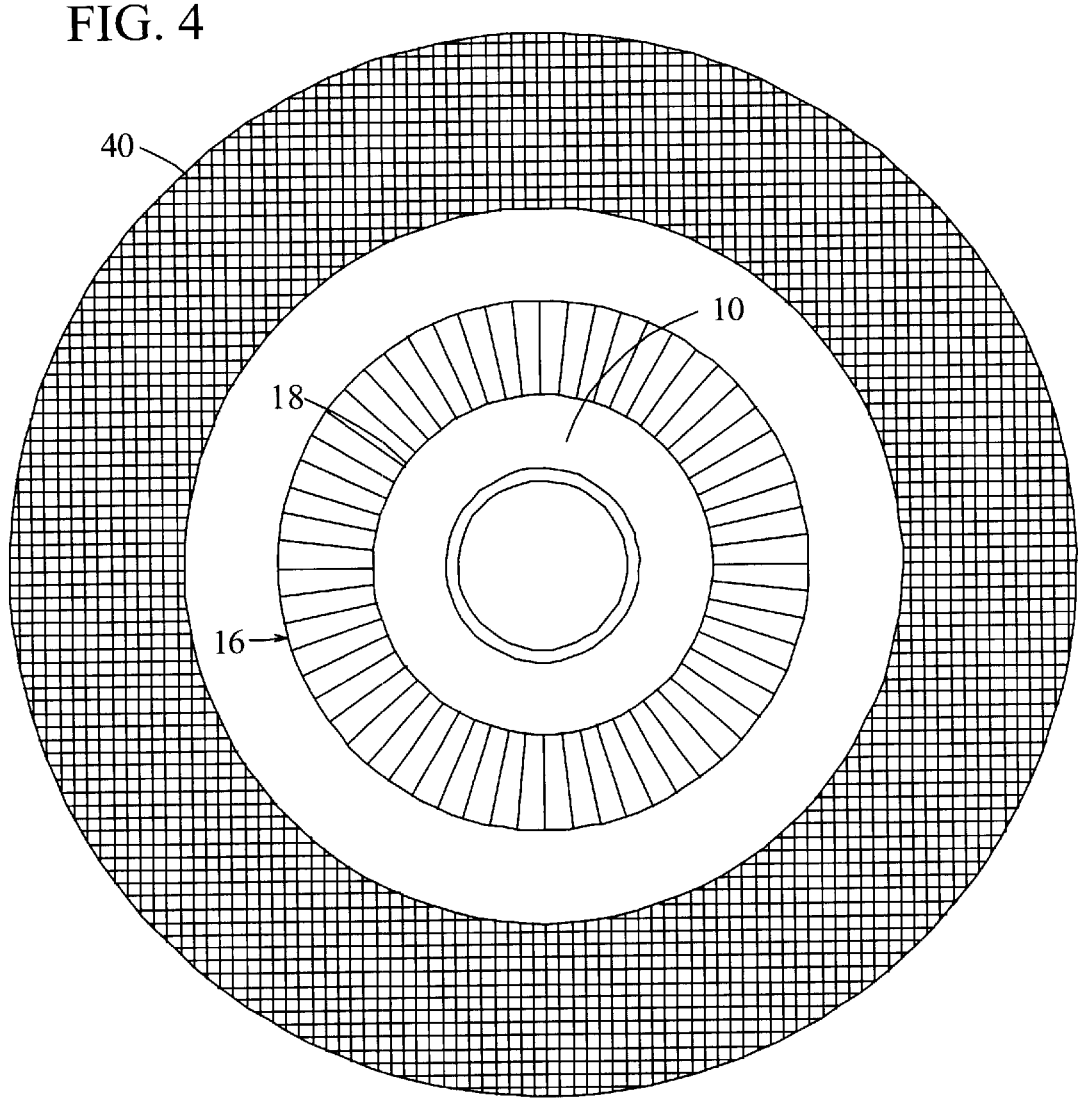
FIG. 4 is a cross sectional view of an exemplary catalytic converter, taken along lines 3—3 of FIG. 2.

This method of magnetic impulse welding can also be used to size the shell onto the mat support material surrounding the exhaust emission control device to produce a desired mat density within the exhaust emission control device. As illustrated in FIG. 4, the exhaust emission control device 10 is placed into an induction coil 40. A current is discharged through the induction coil 40 to create eddy currents on the surface of shell 16. The magnetic field will shrink or collapse the shell 16 about the mat support material; i.e., will size the shell about the mat support material. This process removes the problems associated with mechanical sizing, for example, tool wear, part contamination, measuring problems or expense.

This method employs a current created in the induction coil of greater than about 200,000 amperes, with up to about 300,000 amperes preferred. Generally, the force created is sufficient to shrink the shell about the mat support material. The time to size a work piece using this method is less than about 50 microseconds.

The present method of producing an exhaust emission control device will solve the problems of costly and time consuming manufacturing processes. This process is high precision allowing for greater control (repeatability). It can also be used to join non-round objects or dissimilar metals. Thin materials can be easily used and this decreases the part weight as well as the thermal mass (improved emission control performance). Magnetic impulse welding creates a strong attachment between materials and springback is minimal since there is a permanent deformation of the materials. This process requires no filler materials and takes much less time and energy to complete than the conventional welding process, while generating little or no heat. Use of magnetic impulse welding also provides the benefit of welding and sizing of the catalytic converter at the same station. Furthermore, the present process does not employ a mandrel or other internal shaping device, yet allows sizing and welding to occur in a single, efficient, unique process.

While preferred embodiments have been shown and described, various modifications and substitutions may be made thereto without departing from the spirit and scope of the invention. Accordingly, it is to be understood that the apparatus and method have been described by way of illustration only, and such illustrations and embodiments as have been disclosed herein are not to be construed as limiting to the claims.

What is claimed is:

1. A method for manufacturing an exhaust emission control device, comprising:

disposing a first end around a second end;

disposing an induction coil around the first end;

discharging a current through the induction coil;

forming eddy currents on the surface of the first end; and magnetic impulse sizing the first end and the second end together;

wherein the first end disposed around the second end and wherein the first end or the second end comprises an exhaust emission control device end.

2. The method of claim 1, wherein the first end or the second end comprise a tube end and wherein the method further comprises creating an annular gap between the exhaust emission control device and the tube end.

3. The method of claim 1, further comprising disposing an element within a shell; disposing the induction coil around the shell; and collapsing the shell about the element at a velocity sufficient to size he shell to the element by magnetic impulse.

4. The method of claim 1, further comprising disposing an open end of a shell about the open end of an endplate; disposing the induction coil round the endplate inside the open end of the shell; and collapsing the shell about the endplate at a velocity sufficient to magnetic impulse weld the shell with the endplate.

5. The method of claim 1, wherein the device is selected from the group consisting of particulate filters, plasma conversion devices, catalytic converters, traps, and adsorbers/absorbers.

6. The method of claim 5, wherein the traps are selected from the group consisting of sulfur traps, hydrogen traps, sulfide traps, and carbon monoxide traps.

7. A method for manufacturing an exhaust emission control device, comprising:
disposing a substrate within a shell;
disposing an induction coil around the shell;
discharging a current through the induction coil;
forming eddy currents on the surface of the shell; and
magnetic impulse sizing or welding the shell about the substrate.

8. The method of claim 7, further comprising disposing a mat support material between the shell and the substrate.

9. The method of claim 7, wherein the device is selected from the group consisting of particulate filters, plasma conversion devices, catalytic converters, traps, and adsorbers/absorbers.

10. The method of claim 7, wherein the substrate comprises a form selected from the group consisting of form of foils, sponges, performs, mats, fibrous materials, porous glasses, foams, pellets, particles, and combinations comprising at least one of the foregoing forms.

11. The method of claim 7, further comprising disposing a catalyst on at least a portion of the substrate, and disposing a mat support material around the substrate.

12. The method of claim 7, wherein the substrate comprises a material selected from the group consisting of ceramics, metals, cermets, carbides, silicides, nitrides, and combinations comprising at least one of the foregoing materials.

13. A method for manufacturing an exhaust emission control device comprising:
disposing a first end around a second end;
disposing an induction coil around the first end;
discharging a current through the induction coil;
forming eddy currents on the surface of the first end; and
magnetic impulse welding the first end and the second end together;
wherein the first end disposed around the second end comprises an end component disposed around an end of a shell or wherein the first end disposed around the second end comprises the shell end disposed around the end component, and wherein the end component is selected from the group consisting of endplates and endcones.

14. The method of claim 13, further comprising creating an annular gap or interference between the shell and the end component.

15. The method as in claim 13, wherein the shell further comprises a catalyst substrate comprising a catalyst material surrounded by a mat support material.

* * * * *